: US 7,898,128 B2
(45) Date of Patent: Mar. 1, 2011

(12) United States Patent
Hattori et al.

(54) FORCED COOLING ROTARY ELECTRIC MACHINE

(75) Inventors: Kenichi Hattori, Hitachiota (JP); Tadaaki Kakimoto, Hitachi (JP); Akitomi Semba, Hitachi (JP); Mitsuru Saeki, Hitachinaka (JP); Mitsunori Sezaki, Mito (JP); Takashi Shibata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 421 days.

(21) Appl. No.: 11/972,796

(22) Filed: Jan. 11, 2008

(65) Prior Publication Data

US 2008/0169710 A1 Jul. 17, 2008

(30) Foreign Application Priority Data

Jan. 15, 2007 (JP) .............................. 2007-005779

(51) Int. Cl.
*H02K 9/04* (2006.01)
(52) U.S. Cl. .............................. 310/61; 310/53; 310/214
(58) Field of Classification Search .......... 310/216.082, 310/216.119, 154.18, 19, 156.19, 53, 54, 310/58, 59, 214
See application file for complete search history.

(56) References Cited

U.S. PATENT DOCUMENTS

| 3,949,255 | A | * | 4/1976 | Brown et al. | 310/214 |
| 4,369,389 | A | * | 1/1983 | Lambrecht | 310/214 |
| 5,091,666 | A | * | 2/1992 | Jarczynski | 310/54 |
| 5,854,525 | A | * | 12/1998 | Pommelet | 310/214 |
| 6,121,708 | A | * | 9/2000 | Muller | 310/214 |
| 6,124,659 | A | * | 9/2000 | Rowe et al. | 310/214 |
| 2004/0263017 | A1 | * | 12/2004 | De Lima et al. | 310/214 |
| 2006/0071573 | A1 | * | 4/2006 | Fujita et al. | 310/216 |

FOREIGN PATENT DOCUMENTS

| CH | 648439 | A5 | * | 3/1985 |
| JP | 52072402 | A | * | 6/1977 |
| JP | U-S54-107803 | | | 1/1978 |

(Continued)

OTHER PUBLICATIONS

Notification of Reasons for Rejection in Japanese Patent Application No. 2007-005779 drafted Nov. 13, 2008 (with English translation).

(Continued)

*Primary Examiner*—Quyen Leung
*Assistant Examiner*—Naishadh N Desai
(74) *Attorney, Agent, or Firm*—Brundidge & Stanger, P.C.

(57) ABSTRACT

The invention aims at providing a forced cooling rotary electric machine capable of bringing temperature distribution close to a designed temperature distribution and avoiding becoming a larger size, and employs a wedge formed with ventilation grooves and a wedge not formed with the ventilation grooves to regulate the flow rates of cooling gas passing through air ducts, so that the cooling gas supplied to a part of a stator core, in which temperature is low, can be caused to flow positively to a part in which the temperature is high and the temperature distribution in the axial direction of the stator core can be uniformized. As a result, the temperature distribution in the axial direction of the stator core can be brought close to a designed temperature distribution, and a forced cooling rotary electric machine that need not be made larger in size with a margin can be obtained.

2 Claims, 7 Drawing Sheets

FOREIGN PATENT DOCUMENTS

| | | |
|---|---|---|
| JP | U-S57-141666 | 2/1981 |
| JP | U-S63-172259 | 11/1988 |
| JP | 11-332142 | 11/1999 |
| JP | 2006-109616 | 4/2006 |

OTHER PUBLICATIONS

Notification of Reasons for Rejection in Japanese Patent Application No. 2007-005779 drafted Nov. 10, 2009 (with English translation).

* cited by examiner

_US 7,898,128 B2_

FORCED COOLING ROTARY ELECTRIC MACHINE

BACKGROUND OF THE INVENTION

The present invention relates to a forced cooling rotary electric machine configured so that cooling gas is caused to flow forcedly by a self-cooling fan provided on a rotating shaft or a separate type air blower to cool internal equipment in the rotary electric machine such as a turbine generator and an electric motor. More particularly, it relates to a forced cooling rotary electric machine suitable for cooling a stator core that is subjected to a variable magnetic field and is heated.

Generally, to cool a stator core and to uniformize the temperature distribution in the axial direction of the stator core (stacking direction of silicon steel plates), a forced cooling rotary electric machine in which a plurality of air ducts are provided in the axial direction of a stator core has already been proposed as shown, for example, in JP-A-2006-109616 (FIGS. 6 and 7).

In such a forced cooling rotary electric machine, depending on the type and construction of machine, the temperature distribution in the axial direction of the stator core is uniformized by changing the ventilation cross-sectional areas of the air ducts while the core stacking pressure between the adjacent air ducts is made equal, or the temperature distribution in the axial direction of the stator core is uniformized by changing the core stacking pressure between the adjacent air ducts each having the same ventilation cross-sectional area.

BRIEF SUMMARY OF THE INVENTION

As described above, by changing the cross-sectional areas of the air ducts or by changing the core stacking pressure between the air ducts, cooling gas can be distributed in the axial direction of the stator core in a well-balanced manner. The temperature distribution in the axial direction of the stator core can be thus uniformized to some degree.

However, even for the forced cooling rotary electric machine having been devised as described above, a ventilation test conducted after the assembly of an actual machine reveals that the temperature distribution as designed initially cannot be obtained because of a difference in flow path resistance caused by a difference in length of the circulation flow path of cooling gas, so that satisfaction is scarcely attained. To enhance the cooling capacity from the initial stage, a forced cooling rotary electric machine having a margin must be designed and used, so that the forced cooling rotary electric machine inevitably becomes large in size.

An object of the present invention is to provide a forced cooling rotary electric machine in which the temperature distribution is brought close to the designed temperature distribution, by which a larger size thereof can be avoided.

To achieve the above object, the invention is configured so that a wedge formed with a ventilation groove and a wedge formed with no ventilation groove are used to regulate the flow rates of cooling gas passing through air ducts.

Since the wedge formed with the ventilation groove and the wedge formed with no ventilation groove are employed as described above, the wedge with no ventilation groove is used in the air duct provided in an area of a stator core where the temperature is low (the air duct in a cooling path having small flow path resistance) to restrict the flow rate, and by just that much, cooling air can be caused to flow to another air duct (the air duct in a cooling path having large flow path resistance). Also, the wedge formed with the ventilation groove is used in the air duct provided in an area of the stator core where the temperature is high (the air duct in the cooling path having the large flow path resistance), so that the cooling gas can be caused to flow positively. Temperature distribution in the axial direction of the stator core can be thus uniformized. As a result, the temperature distribution in the axial direction of the stator core can be brought close to the designed temperature distribution, and a forced cooling rotary electric machine that need not be made larger in size with a margin can be obtained.

Other objects, features and advantages of the invention will become apparent from the following description of the embodiments of the invention taken in conjunction with the accompanying drawings.

DETAILED DESCRIPTION OF THE INVENTION

The first embodiment of the forced cooling rotary electric machine according to the invention will now be described based on a forced cooling turbine generator shown in FIGS. 1 to 6. The forced cooling turbine generator shown here is a forced cooling turbine generator in which a cooling gas is circulated in the machine without using outside air, and cooling is made in such configuration regardless of the kind of cooling gas.

Figure 1:
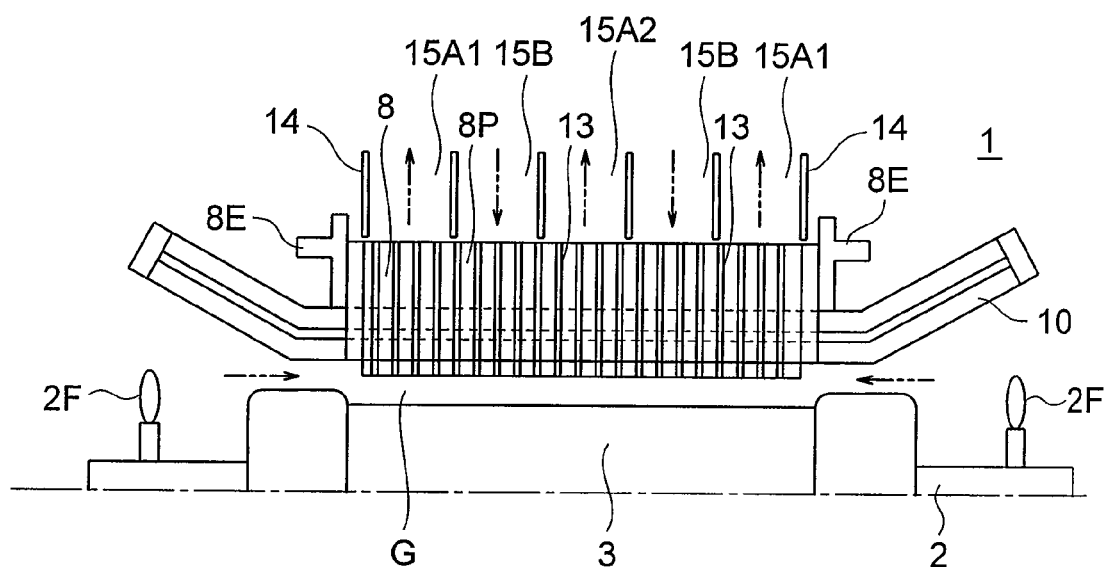
FIG. 1 is a schematic longitudinally-sectioned side view showing the vicinity of a stator core of a forced cooling turbine generator that is the first embodiment of a forced cooling rotary electric machine according to the invention.
Figure 6:
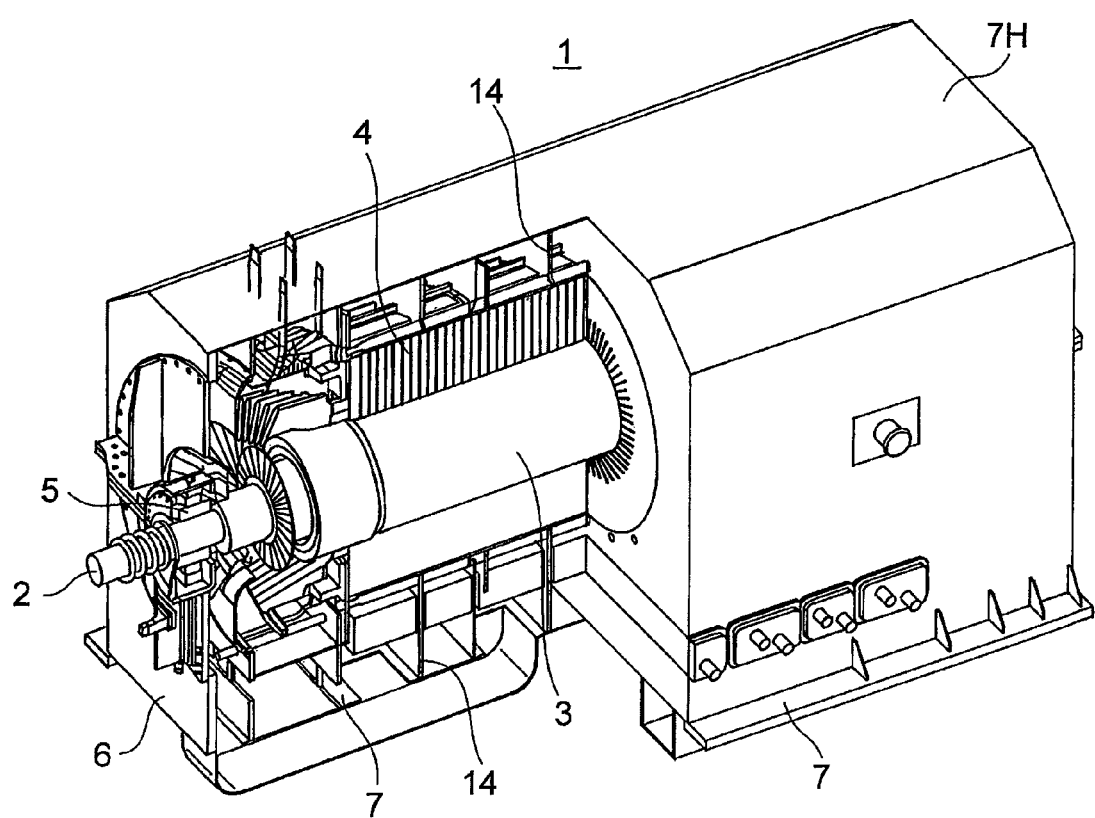
FIG. 6 is a partially-broken perspective view showing an appearance of the forced cooling turbine generator of FIG. 1.

As shown in FIGS. 1 and 6, the forced cooling turbine generator 1 is generally comprised of a rotor 3 formed on a rotating shaft 2, a stator 4 provided at the outer periphery of the rotor 2 with a gap G being provided therebetween, an end frame 6 supporting the rotating shaft 2 via bearings 5, a stator frame 7 fixed to the end frame 6 and supporting the stator 4, and a housing 7H covering the stator frame 7 to form an enclosed structure together with the end frame 6.

Fans 2F are respectively provided on both sides of the rotating shaft 2 with the rotor 3 held therebetween, as shown in FIG. 1, fans 2F are provided. By these fans 2F, the cooling gas is introduced into the gap G between the rotor 3 and the stator 4, and is supplied toward the central part side in the axial direction of the rotor 3.

Although not shown in the figures, the rotor 3 has a field core and a field winding wound around the field core and forms a plurality of magnetic poles in the circumferential direction.

The stator 4 is comprised of a stator core 8 that is formed by stacking silicon steel plates in the axial direction of the rotating shaft 2 and by clamping the lamination ends with end clamps 8E, a plurality of U-shaped winding grooves 9 that each have a depth increasing from the inside of the stator core 8 toward the outside thereof, are formed entirely along the stacking direction of the stator core 8, and are formed at equal intervals in the circumferential direction, a stator winding 10 incorporated in the winding grooves 9, and a wedge 11 that is driven in a wedge groove 9W formed on the opening side of each winding groove 9 to fix the stator winding 10 in the winding groove 9.

The stator core 8 is formed with a plurality of air ducts 13 that lead from the inside to the outside with duct spacers 12 (FIG. 3) being interposed between the stacked silicon steel plates every a predetermined number of sheets to perform cooling. These air ducts 13 are formed at equal intervals, and packets 8P, each of which is the stacking unit of silicon steel plates positioned between the air ducts 13, are formed so as to each have the same thickness.

Further, on the back surface side (outside diameter side) of the stator core 8, partition walls 14 are provided every a plurality of packets, by which ventilation zones 15A1, 15A2 that allow the cooling gas to flow from the inside to the outside diameter side and ventilation zones 15B that allow the cooling gas to flow from the outside to the inside diameter side are formed alternately in plural numbers.

The stator 4 of the forced cooling turbine generator configured as above is cooled as described below. The cooling gas pressurized by the fans 2F is introduced into the gap G between the rotor 3 and the stator 4, and is supplied toward the center side in the axial direction of the gap G. In the air ducts 13 opposed to the ventilation zones 15A1, 15A2, the cooling gas flows from the inside to the outside, and flows to the back surface side of the stator core 8. From there, the cooling gas reaches the fans 2F via a cooler, not shown. On the other hand, in the air ducts 13 opposed to the ventilation zones 15B, the cooling gas pressurized by the fans 2F is introduced to the back surface side of the stator core 8 via air ducts, not shown. From there, the cooling gas flows from the outside to the inside of the air ducts 13, and reaches the air ducts 13 of the adjacent ventilation zones 15A1 and 15A2 after passing through the gap G. Then, the cooling gas flows from the inside to the outside, reaching the back surface side of the stator core, and from there, reaches the fans 2F via the cooler, not shown.

By the above flowing of the cooling gas, the stator core 8 is cooled. Naturally, in the air ducts 13 opposed to the ventilation zones 15A1 close to the fans 2F, a large quantity of the cooling gas flows, and in the ventilation zones 15A2, 15B distant from the fans 2F, a small quantity of the cooling gas flows. In other words, a difference in flow rate of cooling gas is caused by the difference in flow path resistance resulted from the difference in length between circulation flow paths, which are cooling gas flow paths in which the cooling gas flows through the fans 2F and the air ducts 13. Such nonuniformity of the flow rate of the cooling gas results in nonuniformity of cooling temperature. Therefore, the temperature rise in the central part in the axial direction of the stator core 8 is remarkable as compared with the both end parts in the axial direction thereof, and there arises a problem that a turbine generator must be designed so as to have the maximum value of this temperature rise.

Figure 2:
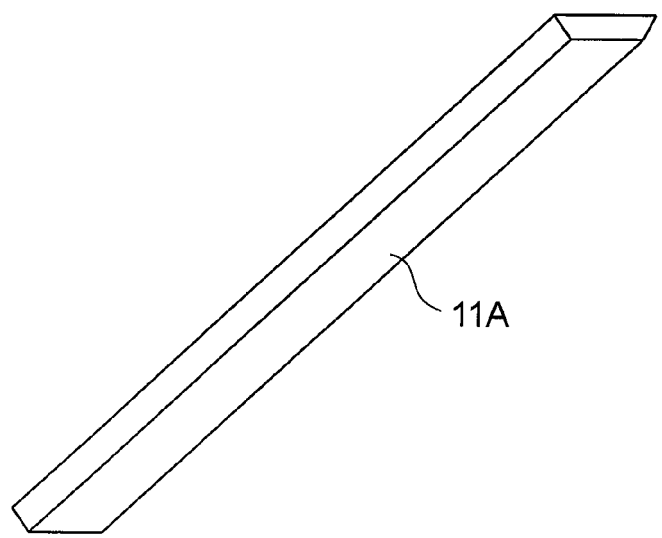
FIG. 2 is a perspective view showing a wedge used in the first embodiment.
Figure 3:
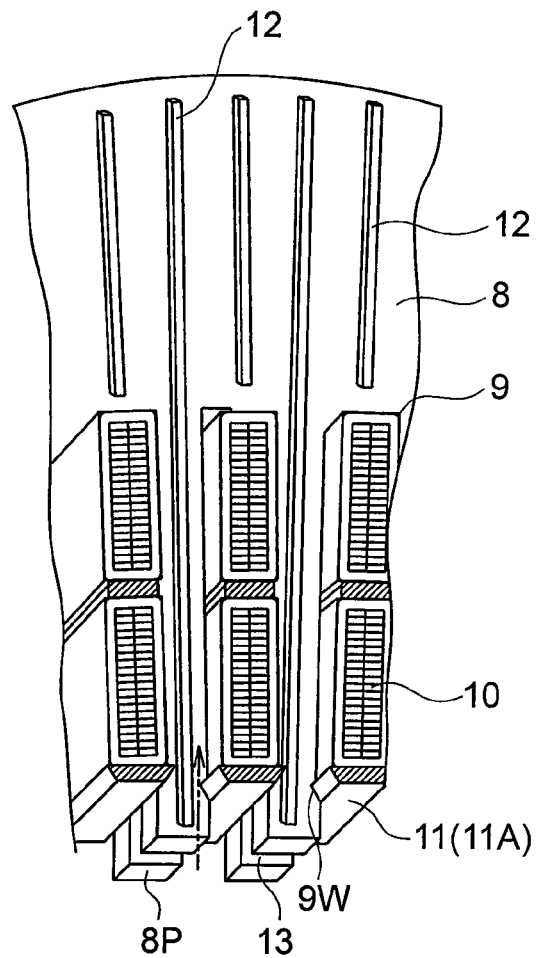
FIG. 3 is an enlarged perspective view showing a part of a stator using the wedge shown in FIG. 2.
Figure 4:
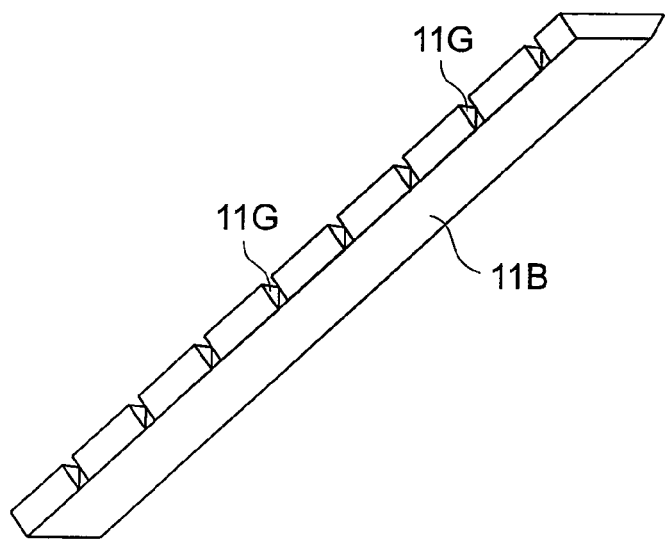
FIG. 4 is a perspective view showing another wedge used in the first embodiment.
Figure 5:
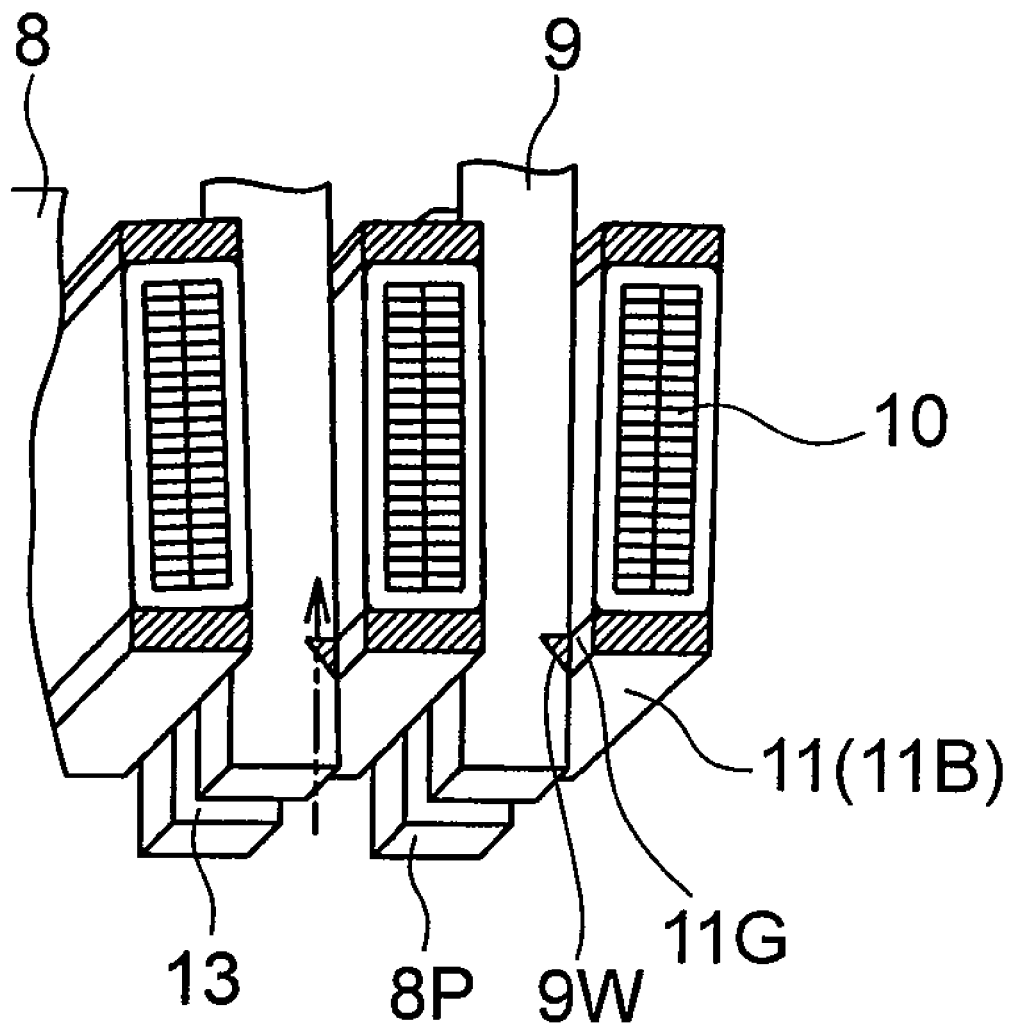
FIG. 5 is an enlarged perspective view showing a part of the stator using the wedge shown in FIG. 4.

In view of the above, in this embodiment, the cooling temperature is made more uniform by adjusting the nonuniformity of the flow rate of the cooling gas by the wedges 11. Specifically, the circulation flow paths of the cooling gas passing through the air ducts 13 opposed to the ventilation zones 15A1 close to the fans 2F are short and the flow path resistance is small, and a large quantity of the cooling gas flows in these air ducts 13. Therefore, to the stator core 8 opposed to the ventilation zones 15A1, wedges 11A, which have the same trapezoidal cross section over the total length as shown in FIG. 2, are applied. As shown in FIG. 3, the wedges 11A facing to the air ducts 13 serve as resistance members, so that the cooling gas flowing in the air duct 13 is throttled and its flow rate is restricted. On the other hand, since the circulation flow paths of the cooling gas, which pass through the air ducts 13 opposed to the ventilation zones 15A2, 15B distant from the fans 2F are long and the flow path resistance is large, the flow rate of the cooling gas is restricted. Therefore, to the stator core 8 opposed to the ventilation zones 15A2, 15B, wedges 11B, which are provided with ventilation grooves 11G at positions opposed to the air ducts 13 as shown in FIG. 4, are applied. As shown in FIG. 5, there is no resistance member facing the air ducts 13, and the flow rate of the cooling gas flowing into and out of the air ducts 13 can be increased. The wedges 11A and 11B cooperatively serve as flow path resistance regulating means for making more uniform the flow path resistances of the cooling gas flow paths, and also as flow rate regulating means for making more uniform the flow quantities of the cooling gas flow paths according to the invention.

Figure 7:
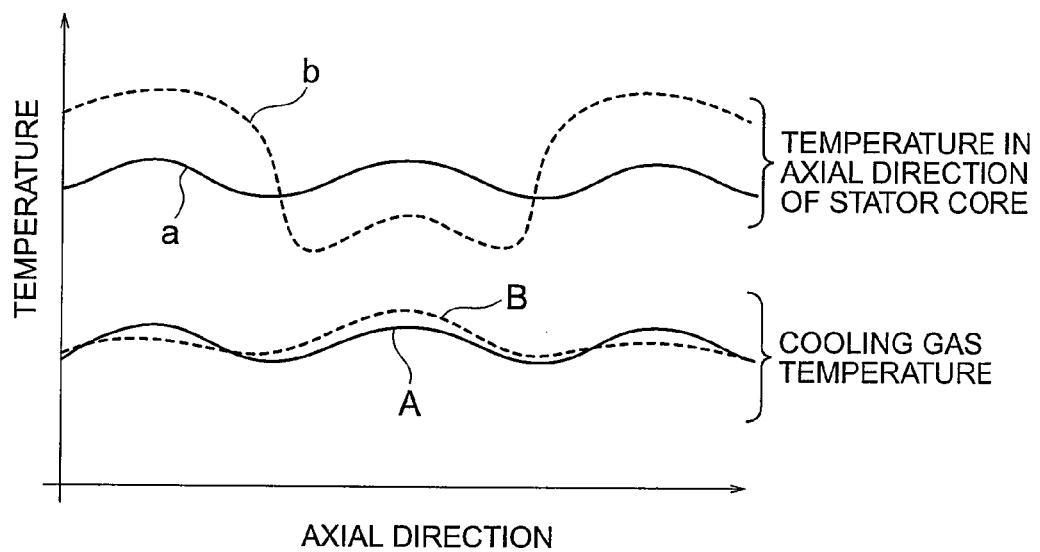
FIG. 7 is a diagram showing temperature distribution in the axial direction of the stator core according to the first embodiment.

As described above, by selectively using the wedge 11A having no ventilation grooves and the wedge 11B having the ventilation grooves 11G for each of the air ducts 13 opposed to the ventilation zones 15A1, 15A2 and 15B, the cooling gas temperature and the temperature distribution in the axial direction of the stator core could be uniformized as shown in FIG. 7.

More specifically, as shown in FIG. 7, in this embodiment A, by raising the temperature at the both end parts in the axial direction and by lowering the temperature at the central part in the axial direction, by which the cooling air temperature could be uniformized approximately as compared with a conventional example B in which the cooling gas temperature is high on the central part side in the axial direction of the stator core 8. As a result, according to this embodiment a, the temperature distribution in the axial direction of the stator core 8 could also be uniformized approximately as compared with a conventional example b. The conventional examples B and b show the case where the installation intervals of air ducts are made large at the both end parts in the axial direction, and made small at the central part in the axial direction to uniformize the flow rate of the cooling gas. In the conventional examples, by making the installation intervals of the air ducts large at the both end parts in the axial direction, the thickness of a packet 8P, which is the stacking unit of silicon steel plates at the both end parts in the axial direction is also increased. As a result, temperature of these parts rises in proportion to the square of the packet thickness, and as shown in FIG. 7, the temperature rise at the both end parts in the axial direction of the stator core is remarkable. In this embodiment a, the thickness of the packet 8P is the same over the length in the axial direction of the stator core 8, and the temperature distribution in the axial direction of the stator core 8 could be uniformized approximately as the temperature distribution of the cooling gas.

As described above, according to this embodiment, since the temperature distribution in the axial direction of the cooling gas and the stator core 8 can be uniformized approximately, the temperature rise of the whole can be restrained effectively, and also portions where temperature rises remarkably are eliminated. Therefore, there is no need to increase the size of the turbine generator so as to give a margin to the cooling capacity.

In the above-described embodiment, for example, the circulation flow path of the cooling gas passing through the air duct 13 of the ventilation zone 15A1 close to the fan 2F is from the fan 2F and returns to the fan 2F through the gap G, the air duct 13 and the back surface of stator core. In the case where all the cooling gas reaching the back surface side of the stator core 8 is discharged in one direction, for example, in the upward direction, differences in circulation flow path length of cooling gas are caused in the circumferential direction of the air duct 13. Specifically, even in the identical air duct 13, a difference in length of circulation flow path arises between the circulation flow path of the cooling gas passing through the side close to the discharge side and the circulation flow path of the cooling gas passing through the side distant from the discharge side. Naturally, if the circulation flow path is long, the flow path resistance increases, and the flow rate of the cooling gas flowing there is restricted.

Figure 8:
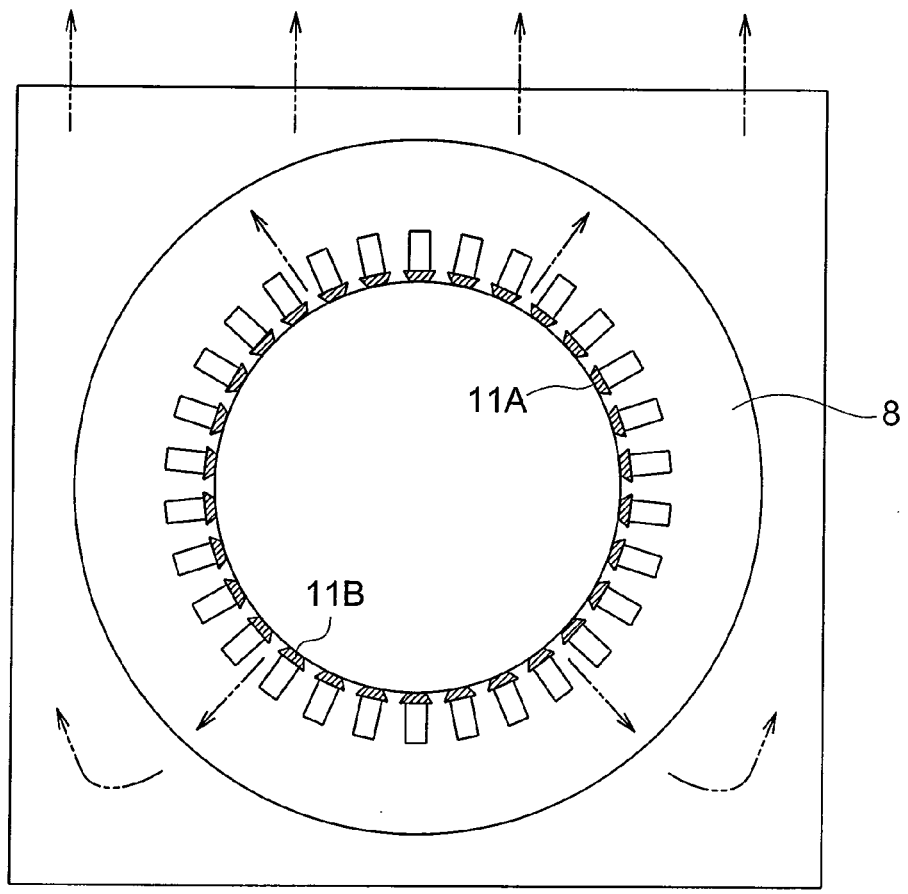
FIG. 8 is a longitudinally-sectioned front view of a stator, showing the second embodiment of a forced cooling rotary electric machine according to the invention.

Accordingly, in the second embodiment of the forced cooling rotary electric machine according to the invention, as shown in FIG. 8, in the same air duct 13, the wedges 11B having the ventilation grooves 11G are provided on the side where the circulation flow paths of the cooling gas are long, and the wedges 11A having the trapezoidal cross section over the total length are provided on the side where the circulation flow paths of the cooling gas are short.

More specifically, in this embodiment, in the case where the discharge direction of the cooling gas is above the stator core 8, the wedges 11A having the same trapezoidal cross section over the total length are used in the upper half of the air duct 13 to restrict the flow rate of the cooling gas, and the wedges 11B having the ventilation grooves 11G are used in the lower half of the air duct 13 to increase the flow rate of the cooling gas. In other words, the flow path resistance is increased in the upper half of the air duct 13, and the flow path resistance is decreased in the lower half thereof, so that the flow rate of the cooling gas is uniformized.

In this embodiment, the case where the cooling air is caused to flow from the inside to the outside of the air duct 13 has been explained. Needless to say, this configuration can also be applied to the case where the cooling air is caused to flow from the outside diameter side to the inside diameter side of the air duct 13.

Thus, the flow path resistance in the circumferential direction of the air duct 13 can be changed by using the wedge 11A having no ventilation grooves 11G and the wedge 11B having the ventilation grooves 11G in combination. As a result, the flow rates of all the circulation flow paths of the cooling gas are uniformized, and the temperature distribution in the circumferential direction of the stator core 8 can be uniformized.

Figure 9:
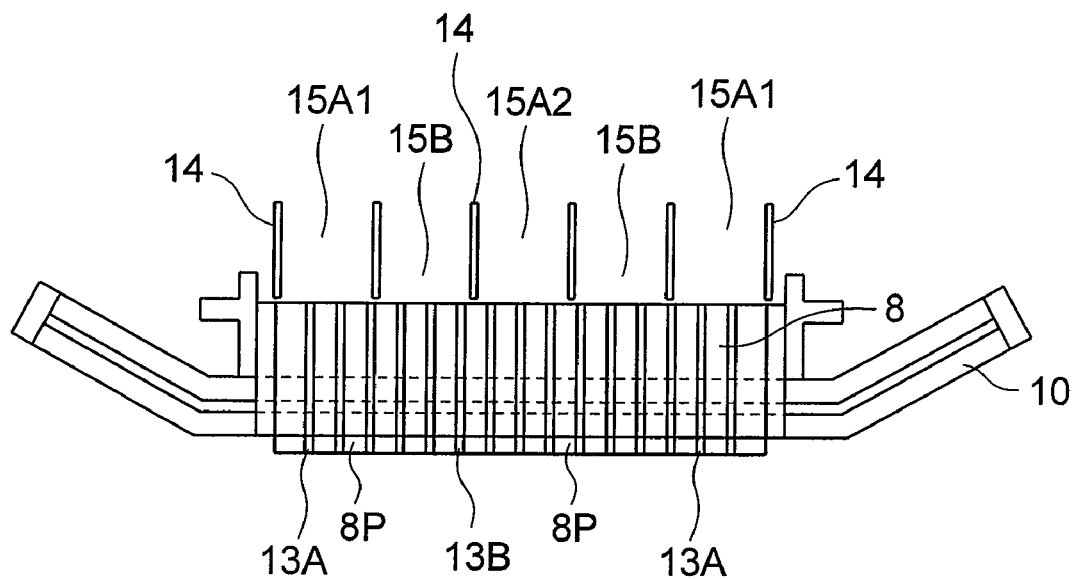
FIG. 9 is a longitudinally-sectioned side view of a stator, showing the third embodiment of a forced cooling rotary electric machine according to the invention.

FIG. 9 shows the third embodiment of the forced cooling rotary electric machine according to the invention. This embodiment differs from the first and second embodiments in that a plurality of air ducts 13A and 13B each having a different space are provided in the axial direction of the stator core 8. The packets 8P, each of which is the stacking unit of silicon steel plates positioned between the air ducts 13A and 13B, have the same thickness.

Specifically, the space of the air ducts 13A of the ventilation zones 15A1 at both end parts in the axial direction of the stator core 8 is made small, and the space of the air ducts 13B of the ventilation zones 15A2, 15B in the intermediate part in the axial direction of the stator core 8 is made large.

By this configuration, since the flow area of the air ducts 13A close to the fans 2F is decreased and the flow path resistance of the cooling gas increases, the flow rate of the cooling gas decreases. Accordingly, the cooling gas can be allowed to flow to the air ducts 13B in the intermediate part in the axial direction. Further, since the flow area of the air ducts 13B distant from the fans 2F is increased and the flow path resistance of the cooling gas decreases, the flow rate of the cooling gas increases. As a result, the flow rates of the cooling gas on the side close to the fans 2F and on the side distant from the fans 2F can be uniformized. Therefore, the temperature distribution of the stator core 8 can be uniformized.

In this embodiment, the flow path resistance is changed by changing the spaces of the air ducts 13A and 13B. Further, the wedges 11A and 11B in the first and second embodiments are used. Therefore, the flow rate of the cooling gas flowing in all the circulation flow paths passing through the air ducts 13A and 13B can be uniformized more.

As described above, this embodiment can also achieve an effect equivalent to that of the first embodiment.

Figure 10:
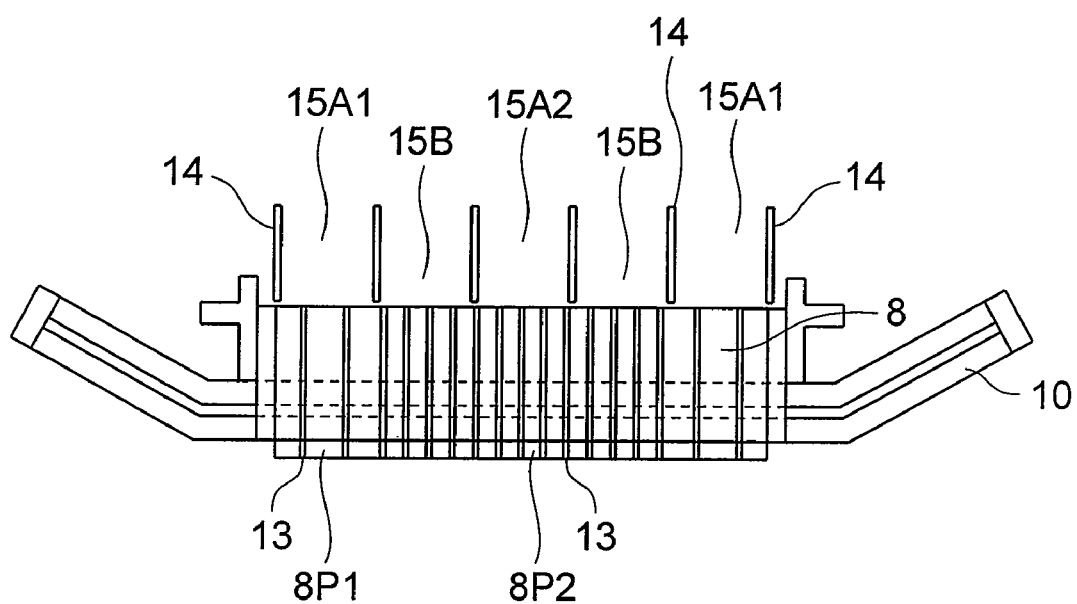
FIG. 10 is a longitudinally-sectioned side view of a stator, showing the fourth embodiment of a forced cooling rotary electric machine according to the invention.

FIG. 10 shows the fourth embodiment of the forced cooling rotary electric machine according to the invention. This embodiment differs from the third embodiment shown in FIG. 9 in that gap dimensions of all the air ducts 13 are made the same, the thickness of a packet 8P1 opposed to the ventilation zones 15A1 at the both end parts in the axial direction of the stator core 8 is increased, and the thickness of a packet 8P2 opposed to the ventilation zones 15A2, 15B is decreased. In other words, in this configuration, the number of the air ducts 13 of the ventilation zones 15A1 at the both end parts in the axial direction of the stator core 8 is decreased, and the number of the air ducts 13 of the ventilation zones 15A2, 15B at the intermediate part in the axial direction of the stator core 8 is increased.

By increasing the number of the air ducts 13 in the ventilation zones 15A2, 15B at the intermediate part in the axial direction of the stator core 8 as described above, the flow rate of the cooling gas is increased, and thereby the flow rate of the cooling gas of the air ducts 13 of the ventilation zones 15A1 at the both end parts in the axial direction of the stator core 8 can be reduced. As a result, the temperature distribution in the axial direction of the stator core 8 can be uniformized.

In this embodiment as well, the wedges 11A, 11B in the first and second embodiments are used. Therefore, the flow rate of the cooling gas flowing in all the circulation flow paths passing through the air ducts 13A, 13B can be uniformized further.

Figure 11:
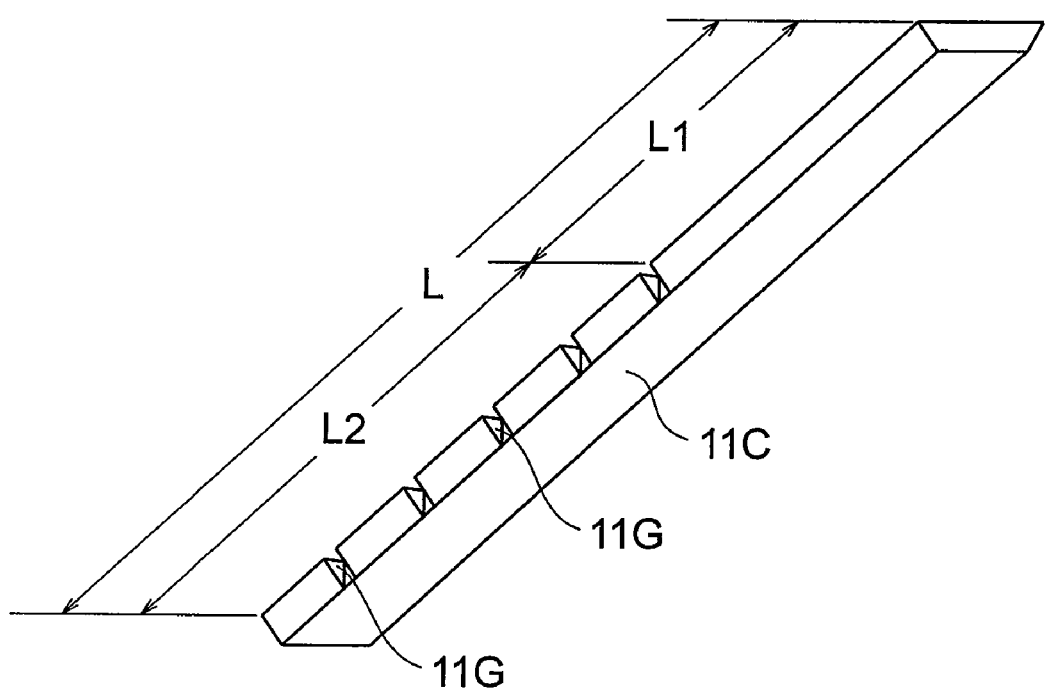
FIG. 11 is a perspective view showing a modification of a wedge used in the forced cooling rotary electric machine according to the invention.

FIG. 11 shows a modification of the wedge used. In the above-described embodiments, as shown in FIG. 1, the length of the wedge 11A, 11B is almost equal to the length of each of the ventilation zones 15A1, 15A2 and 15B, and the wedges 11A, 11B are selectively used to suit the ventilation zones 15A1, 15A2 and 15B.

However, for example, in FIG. 1, when the wedges 11A having the same cross-sectional shape are used for all of the air ducts 13 of the ventilation zones 15A1 at the both end parts in the axial direction of the stator core 8, if a difference arises in the flow rate of the cooling gas, a wedge 11C having a length L in which a section L1 having the same cross-sectional shape and a section L2 having the ventilation grooves 11G are mixedly provided may be used. Further, a plurality of such wedges 11C having the length L may be provided in each of the ventilation zones 15A1, 15A2 and 15B. On the contrary, the wedge 11C having the length L may be provided astride the ventilation zones 15A1 and 15B and the ventilation zones 15A2 and 15B.

As described above, according to the respective embodiments of the invention, the flow path resistance of the circulation flow path of the cooling gas, that is, the flow rate of the cooling gas passing through the air duct is regulated according to the length of the circulation flow path, in other words, the flow path resistance of the circulation flow path, and the temperature distribution in the axial direction of the stator core can be uniformized approximately.

In the above-described embodiments, as the forced cooling rotary electric machine, the forced cooling turbine generator has been explained as one example. However, it is a matter of course that the invention can also be applied to a forced cooling electric motor. Further, in the above-described embodiments, the forced cooling rotary electric machine in which the cooling gas is circulated within the machine has been explained. However, the invention can also be applied to an open-type forced cooling rotary electric machine in which outside air is introduced, and the exhaust gas after cooling is discharged to the outside of the machine. In the open-type forced cooling rotary electric machine, the lengths of the flow paths of the cooling gas from a fan for introducing outside air to an exhaust section via air ducts naturally differ, and the invention may be applied. Further, in the above-described embodiments, even if the flow path resistance or the flow rate of the cooling gas is uniformized, in some cases, the temperature is not necessarily uniformized. In such a case, a flow path resistance regulating means for uniformizing the temperature of the stator winding incorporated in the winding grooves may be provided on the side facing to the rotor of the air ducts provided in the stator core to approximately uniformize the temperature distribution in the axial direction of the stator core.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A forced cooling rotary electric machine comprising:
a rotor formed on a rotating shaft;
a stator provided around an outer periphery of the rotor with a gap therefrom, said stator having a stator core formed by stacking silicon steel plates along a longitudinal direction of the rotating shaft, a stator winding incorporated in winding grooves formed in the stator core, and wedges having a trapezoidal cross section and inserted in opening sides of the winding grooves to fix the stator winding in the winding grooves, said stator core being formed with a plurality of air ducts in a stacking direction of the silicon steel plates, in which air ducts a cooling gas is forcedly caused to flow, said air ducts being provided at equal intervals in the stacking direction of stacked steel plates;
a plurality of partition walls being provided at equal intervals in the stacking direction of the stacked steel plates on an outer peripheral side of the stator core to form a plurality of ventilation sections, the cooling gas being caused to flow in the adjacent ones of the ventilation sections in reverse directions to each other,
said wedges being formed to have the trapezoidal cross section and including first wedges formed with ventilation grooves at positions opposed to the air ducts and second wedges having no ventilation grooves, said ventilation grooves being formed to have the same size in a direction of the rotary shaft as that of said air ducts in a direction of the rotary shaft and said wedges formed with the ventilation grooves being formed to have at parts of the ventilation grooves the same size in a peripheral direction of the rotary shaft as a width of said winding grooves, so that the wedges present no resistance member facing the air ducts; and
flow path resistance regulating means for making more uniform the flow path resistances of flow paths for the cooling gas being formed by arranging the wedges formed with ventilation grooves on said air ducts in long flow paths for the cooling gas through the ventilation sections and the wedges having no ventilation grooves on said air ducts in short flow paths for the cooling gas.

2. The forced cooling rotary electric machine according to claim 1, wherein the rotating shaft is provided with fans on both sides in an axial direction of the rotor.

* * * * *